Patented June 16, 1931

1,810,055

UNITED STATES PATENT OFFICE

GEORG MÜLLER, OF FRANKFORT-ON-THE-MAIN, AND JOHANNES JAENICKE, OF CRONBERG, NEAR FRANKFORT-ON-THE-MAIN, GERMANY

METHOD OF RECIPROCAL ACTION BETWEEN GASES AND FINELY SUBDIVIDED MATERIALS

No Drawing. Application filed March 20, 1928, Serial No. 263,222, and in Germany February 9, 1927.

This invention relates to a method of reciprocal action between gases and finely subdivided materials.

The reciprocal action between finely subdivided substances and gases has already been utilized for various purposes because the large surface resulting from the subdivision is favourable to all processes which depend on superficial area. Examples comprise the adsorption of constituents of mixtures, such as gasolines from natural gas; also chemical reactions between the gas and substance concerned, such as the separation of sulphur by means of gas-purifying compositions, the saccharification of starch by means of hydrochloric acid vapours, the washing of gases by means of an atomized liquid, the fractional distillation of atomized liquids (phenols from ammonia water), the oxidation of metals or oils by means of air or oxygen in the above described state (analogous to the hydrogenation of various substances); finally the evaporation of solutions, the production of powder by cooling the atomized melts, crystallization by cooling atomized solutions, performing catalytic processes, and the like.

In all these processes the substances have been finely subdivided or atomized in the gas current by pressure or mechanical means, and left to the action of the said gas current. The particles were then carried away from the reaction space (which term is used as a generic expression), by the energy of the gas current, thus necessitating the provision of separating and filtering apparatus for separating the particles from the gas. In these circumstances, the removal of the particles from the gas current before their full action had been developed,—that is to say, before their capacity for being charged with gasolines or their capacity for chemical reaction with the impurities of the gases were completely exploited—was inevitable.

In order to overcome this disadvantage, attempts have been made to pass the material repeatedly through the aparatus for example in a cycle, this naturally complicating the apparatus considerably and forming a source of troublesome phenomena.

It has now been found that the above-described disadvantages can be avoided by employing the process according to the present invention, as hereinafter described. For the sake of brevity, the term "reaction" is supposed to include any reciprocal action between gases and finely subdivided particles, that is to say, not only chemical reaction in the narrow sense but also adsorption, the typical processes above referred to and the like.

The invention consists in bringing the gas and the atomized particles together in such a way that these particles are retained in suspension, their transportation is prevented and a maximum duration of the reaction period is assured. To this end the gas is preferably caused to ascend through the dust (which for example is distributed in a cylinder) until the reactive capacity of the material has been exhausted. The velocity of the gas current is then increased and the zone occupied by the particles is slowly displaced upwardly, while, at the same time, fresh material is charged into the distributor. The spent material is removed at the upper part of the tower, preferably after the gas current has been diverted from the axial direction of the tower. Separation can be effected by known devices, such for example, as cyclone blowers, bag filters, or by electrical gas purification, and the like. Instead of this intermittent system of working, the operation can also be carried on in such a way that the ascending movement of the dust or fog zone and the corresponding replacement by fresh material proceeds in a steady and gradual manner, the rate of charging the distributing member (for example a rotating disc) being adjusted accordingly.

The process has the advantage that the particles remain in contact as long as possible with the gas taking part in the reaction, and that repeated passage through the apparatus, by means of complicated devices, is avoided. The suspension of the particles can be assisted by suitably arranged members (for example fan blades) which may afterwards be employed to remove the articles from the reaction tower. It has been found especially advantageous to construct the walling of the tower in such a way that it is flared so that the cross-section is of constantly increasing dimensions in the upward direction, so that the velocity of the ascending gas current continuously diminishes. By this means any escape of the uppermost particles is reliably prevented, and they redescend in the more slowly moving gas current. This embodiment, moreover, has the advantage that there is no need to be restricted to the use of a material the particles of which are strictly defined and uniform in respect of size. It is, of course, self-evident that the rate at which the dust zone is raised by the gas current must be modified accordingly. The process may also be carried out by disposing two such conical towers side by side, and, after the material has been exhausted in one, diverting the gas current into the second conical tower, in which a further charge of the material is being distributed. Meanwhile the material in the first tower will have settled down, and can be removed through an opening in the bottom. If desired, the process may be so conducted that the reverse reaction of the particles for example the discharge, drying, chemical regeneration, and the like, is effected in the tower which has been placed out of action. It is of course also possible to operate in such a way that provision is made, by automatically pulsating gas currents, for the intermittent removal of the exhaust particles from the reaction chamber.

What we claim is:

1. Process of interacting a stream of gas and a finely divided substance suspended therein in a confined reaction space by so adjusting the velocity of the gas stream that the relative position of the general mass of finely divided substance in the confined space does not substantially change either in the direction of flow of the gas stream or in the opposite direction wherein after completion of the reaction the finely divided substance is removed from the reaction space by increasing the velocity of the gas stream.

2. Process of interacting a stream of gas and a finely divided substance suspended therein in a confined reaction space by so adjusting the velocity of the gas stream that the relative position of the general mass of finely divided substance in the confined space does not substantially change either in the direction of flow of the gas stream or in the opposite direction wherein after completion of the reaction the finely divided substance is removed from the reaction space by suction.

3. Process of interacting a stream of gas and a finely divided substance suspended therein in a confined reaction space by so adjusting velocity of the gas stream that the relative position of the general mass of finely divided substance in the confined space does not substantially change either in the direction of flow of the gas stream or in the opposite direction wherein the finely divided material is maintained in suspension during the course of the reaction by suction and is removed from the reaction space after the completion of the reaction by increasing the suction.

4. Process of interacting a stream of gas and a finely divided substance suspended therein in a confined reaction space by so adjusting the velocity of the gas stream that the relative position of the general mass of finely divided substance in the confined space does not substantially change either in the direction of flow of the gas stream or in the opposite direction wherein the exhausted finely divided particles are intermittently removed from the reaction space after completion of the reaction by causing the gas stream to pulsate.

5. Process of interacting a stream of gas and a finely divided substance suspended therein in a confined reaction space by so adjusting the velocity of the gas stream that the relative position of the general mass of finely divided substance in the confined space does not substantially change either in the direction of flow of the gas stream or in the opposite direction wherein at least two reaction spaces are operated alternately and the exhausted finely divided substance is separated in the reaction space which is out of action.

6. Process of interacting a stream of gas and a finely divided substance suspended therein in a confined reaction space by so adjusting the velocity of the gas stream that the relative position of the general mass of finely divided substance in the confined space does not substantially change either in the direction of flow of the gas stream or in the opposite direction wherein at least two reaction spaces are operated alternately and the exhausted finely divided substance is subjected to a counter-reaction in the reaction space which is temporarily not used for the main reaction.

In testimony whereof we affix our signatures.

Dr. GEORG MÜLLER.
Dr. JOHANNES JAENICKE.